(No Model.) 9 Sheets—Sheet 1.

L. STRICKEL.
MACHINE FOR THE MANUFACTURE OF BRUSHES.

No. 452,468. Patented May 19, 1891.

Witnesses
John Schuman.
Charles F. Salow

Inventor
Louis Strickel
By his Attorney
Newell S. Wright.

(No Model.) 9 Sheets—Sheet 4.

L. STRICKEL.
MACHINE FOR THE MANUFACTURE OF BRUSHES.

No. 452,468. Patented May 19, 1891.

Witnesses
John Schuman
Charles F. Salow

Inventor
Louis Strickel
By his Attorney
Newell S. Wright (No Model.) 9 Sheets—Sheet 5.

L. STRICKEL.
MACHINE FOR THE MANUFACTURE OF BRUSHES.

No. 452,468. Patented May 19, 1891.

Fig. 11

Witnesses
John Schuman.
Charles F. Salow.

Inventor
Louis Strickel
By his Attorney
Newell S. Wright.

(No Model.) 9 Sheets—Sheet 6.

L. STRICKEL.
MACHINE FOR THE MANUFACTURE OF BRUSHES.

No. 452,468. Patented May 19, 1891.

(No Model.) 9 Sheets—Sheet 7.

L. STRICKEL.
MACHINE FOR THE MANUFACTURE OF BRUSHES.

No. 452,468. Patented May 19, 1891.

Witnesses
John Schuman
John F. Miller

Inventor
Louis Strickel
By his Attorney
Newell S. Wright.

(No Model.) 9 Sheets—Sheet 9.

L. STRICKEL.
MACHINE FOR THE MANUFACTURE OF BRUSHES.

No. 452,468. Patented May 19, 1891.

Witnesses
John Schuman
John F. Miller

Inventor
Louis Strickel.
By his Attorney
Newell S. Wright.

UNITED STATES PATENT OFFICE.

LOUIS STRICKEL, OF DETROIT, MICHIGAN, ASSIGNOR OF ONE-HALF TO GEORGE C. WETHERBEE, OF SAME PLACE.

MACHINE FOR THE MANUFACTURE OF BRUSHES.

SPECIFICATION forming part of Letters Patent No. 452,468, dated May 19, 1891.

Application filed March 11, 1890. Serial No. 343,499. (No model.)

*To all whom it may concern:*

Be it known that I, LOUIS STRICKEL, a citizen of the United States, residing at Detroit, county of Wayne, State of Michigan, have invented a certain new and useful Improvement in Machines for the Manufacture of Brushes; and I declare the following to be a full, clear, and exact description of the invention, such as will enable others skilled in the art to which it appertains to make and use the same, reference being had to the accompanying drawings, which form a part of this specification.

My invention relates to certain new and useful improvements in machines for the manufacture of brushes, and has reference more particularly to a machine for the manufacture of brushes of the kind hereinafter specified.

The objects here in view more especially relate to an improved machine for forcing the stock into the brush-head and for nailing the same securely therein, the machine being designed as an improvement on one for a similar purpose for which United States Letters Patent were granted me October 8, 1889, No. 412,305.

My invention therefore consists of the combinations of devices and appliances hereinafter specified and claimed, and more fully illustrated in the accompanying drawings, in which—

Fig. 23 is a view of one of the connecting-bars.

Figure 1:
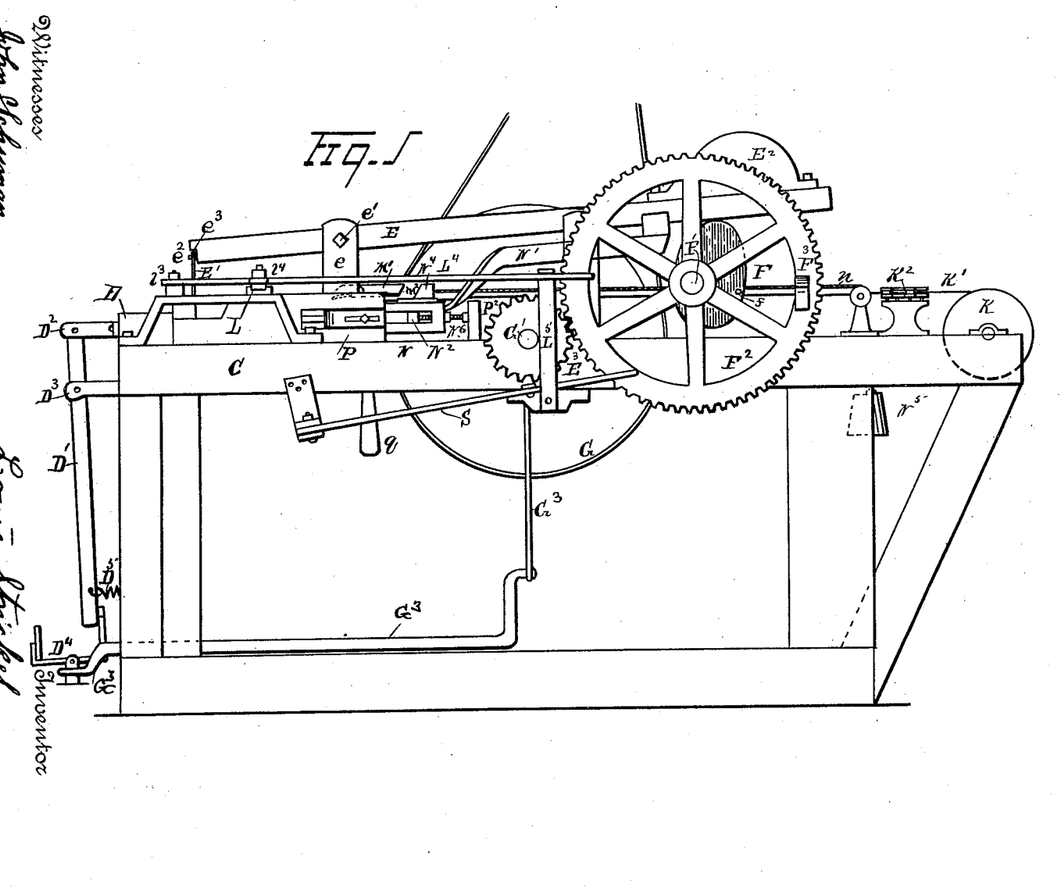
Figure 1 is a side elevation illustrating my invention.
Figure 2:
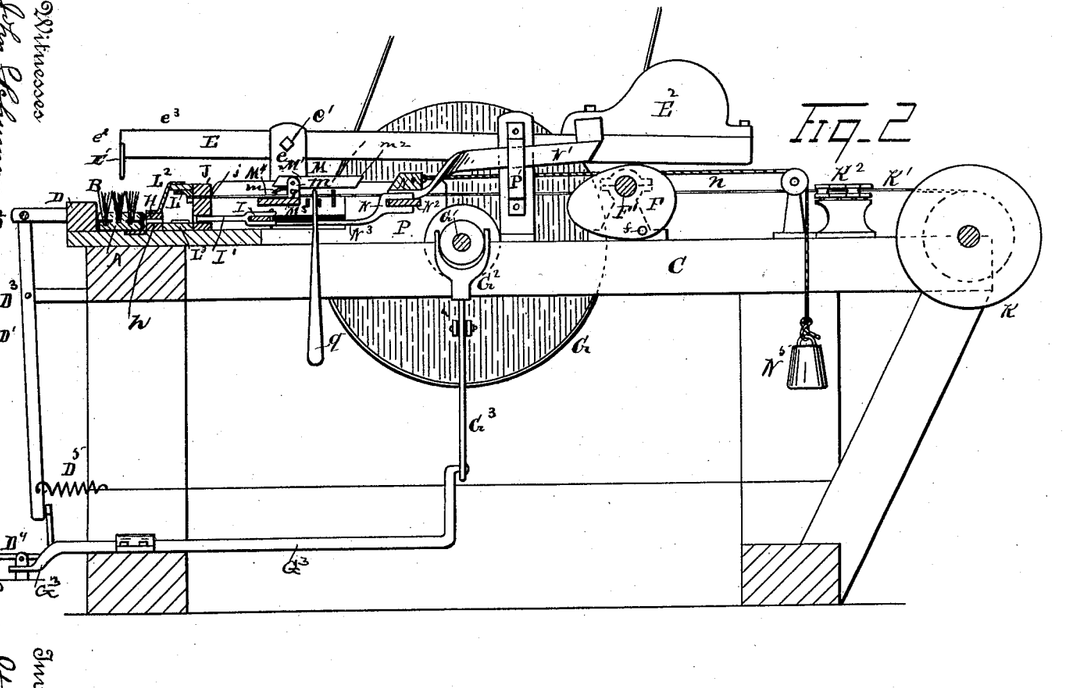
Fig. 2 is a longitudinal vertical section.
Figure 3:
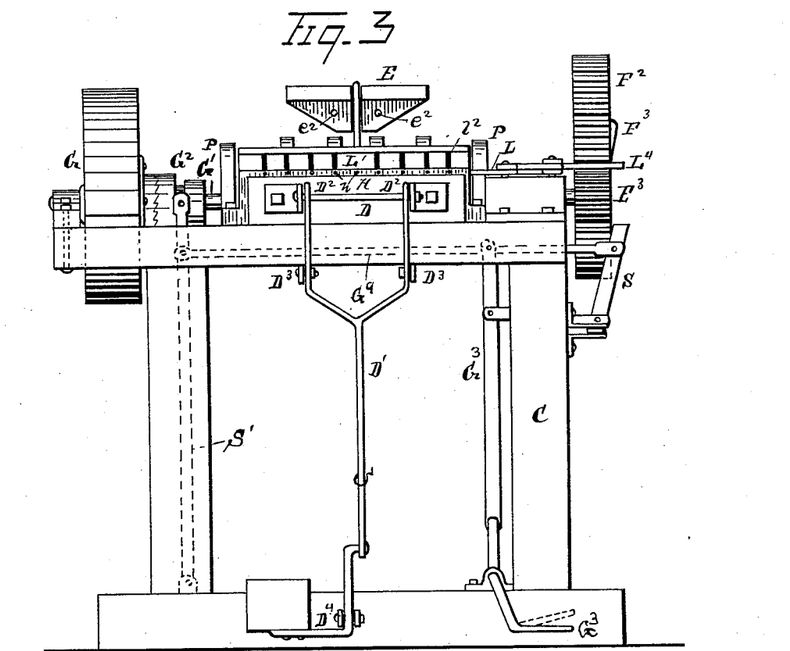
Fig. 3 is a front elevation.
Figure 4:
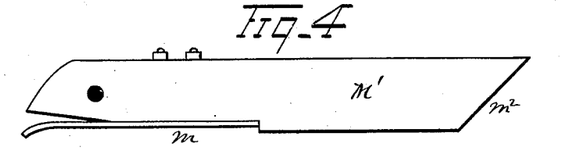
Fig. 4 is a separate view of one of the feeders.
Figure 5:
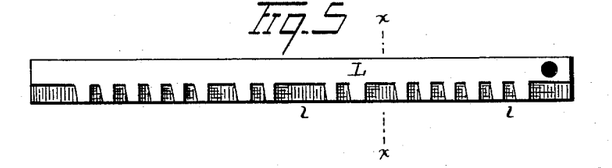
Fig. 5 is a separate view of the cutter-blade.
Figure 6:
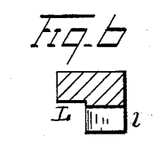
Fig. 6 is a cross-section of the same on line X X, Fig. 5.
Figure 7:
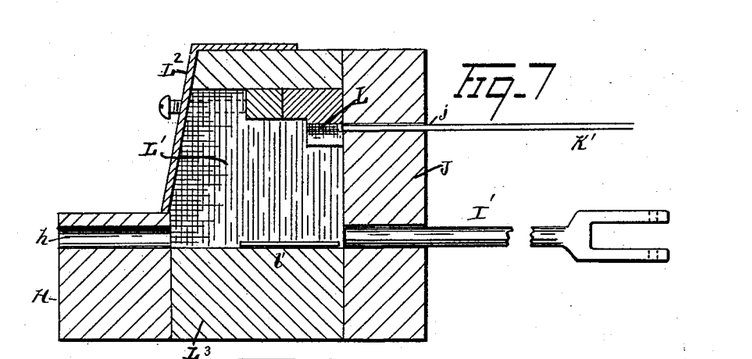
Fig. 7 is an enlarged view in vertical section through the nail-plate, cover-plate, cutter-blade, guide-plate, and related parts on the line $y\,y$, Fig. 8.
Figure 8:
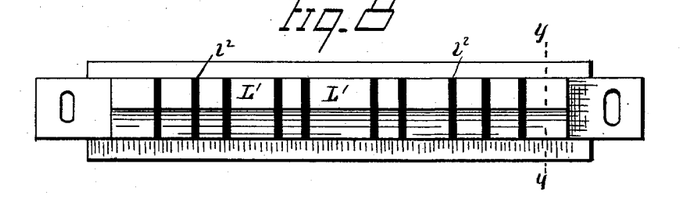
Fig. 8 is a plan view of the same, except the cover-plate, which is removed.
Figures 9, 10:
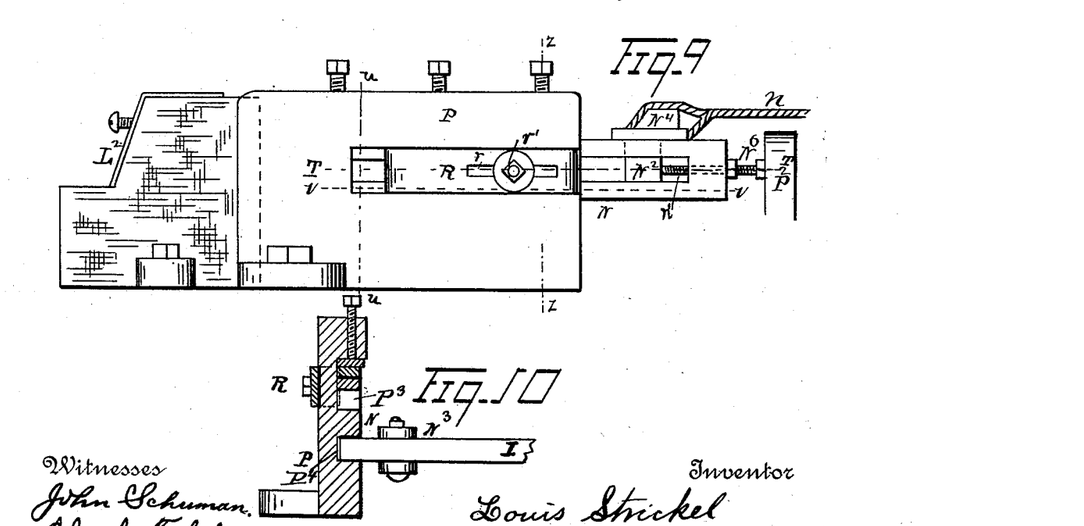
Fig. 9 is a side elevation of the same, together with the reciprocatory carriage.
Fig. 10 is a vertical section on the line $z\,z$, Fig. 9.
Figure 16:
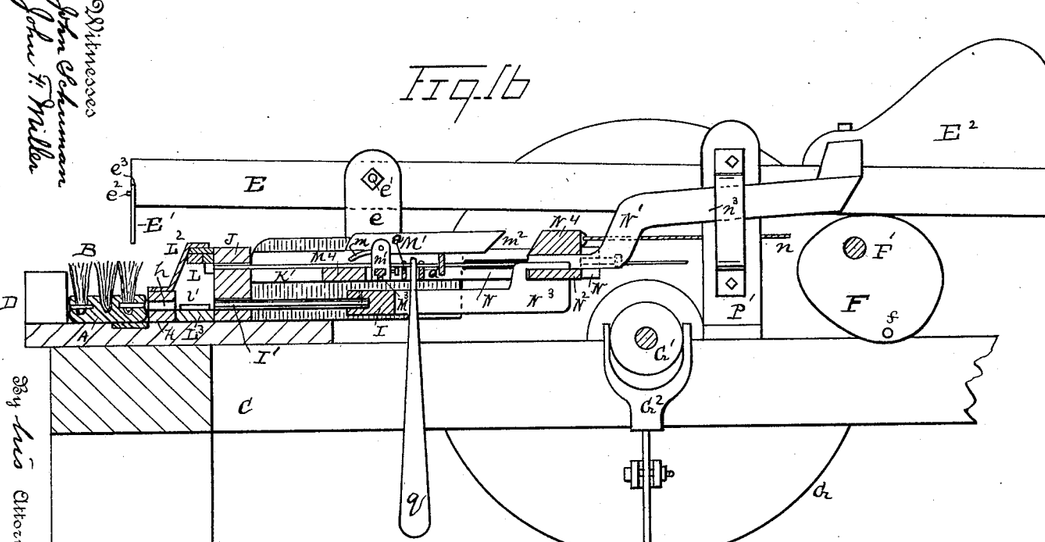
Fig. 16 is a longitudinal section of portions of the mechanism on a larger scale than Fig. 2 and showing the machine in a retracted position.
Figures 17, 21:
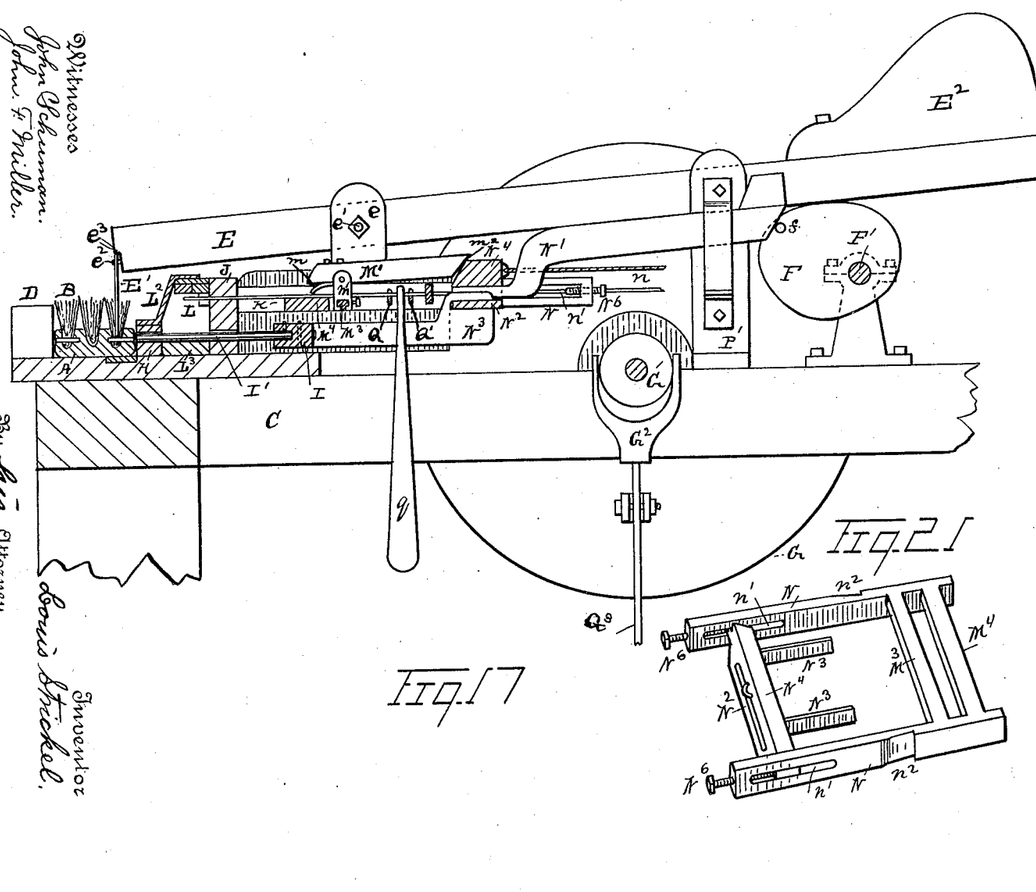
Fig. 17 is a similar view showing the machine in an advanced position ready for driving the nails into the brush-head and for cutting off the nails by a further advance of the carriage.
Fig. 21 is a separate view in perspective showing the carriage.

As shown in Figs. 2, 16, and 17, A is the brush-head constructed with longitudinal grooves, into each of which is secured the stock B by a single binder, which is securely held in place therein by a series of nails driven into the head adjacent to the said binder. To force the stock and binder into their respective grooves, I employ a driving-plate of any desired construction. When the brush-head is provided with more than two grooves, the stock is secured in the intermediate groove or grooves by another machine, inasmuch as the nails have to be driven in the head at an angle to secure the stock in the middle groove or grooves, and rather than to be obliged to shift the position of the nail-drivers for these grooves and the side grooves it is found better to have one machine confined to driving the stock and nails for the middle groove or grooves and use the machine herein set forth for the side grooves. By an independent machine the stock is bent over the binder and forced into a suitable clamp, in which condition it is brought to my present machine for engagement in the side grooves of the head.

I carry out my present invention as follows:

C represents any suitable supporting frame or bed.

D is a movable head-block, which may be adjusted in any desired manner for holding the brush-head in place upon the machine.

E is a vibratory arm axially supported upon the frame intermediate its ends and upon supporting-brackets $e$ by an axis $e'$. This axial engagement is preferably formed of the middle of said arm, as shown. The said arm at its forward end is adapted to engage the driving-plate E' in any suitable manner. Thus the end of the arm is simply provided with studs $e^2$ to engage suitable apertures in said plate. The end of the arm is cut away on its under side to form a shoulder $e^3$ to bear upon the top of said plate in the act of forcing it downward for pressing the stock and binder into the head. The forward or driving end of the arm is caused to exert a downward pressure by means of a rotatable cam F, operating beneath the rear end of the arm, and whereby it is thrown upward to depress the forward end. The said arm is made self-retracting to lift the forward end in any suitable manner, as, for instance, by weighting the rear of the arm, as shown at $E^2$.

F' is the shaft upon which the cam is mounted, said shaft being driven by any suitable power, as, for instance, by means of a driving-pulley G upon a shaft G', geared with the shaft F, as shown at $E^3$. A friction-clutch of any desired construction, as at $G^2$, is provided to control the operation of the driving-pulley, which clutch is operated by a foot-lever mechanism $G^3$. The cam is of such a shape as to hold down the forward end of the arm E while the nails are being driven into the head, the weight being of sufficient heft to readily lift the plate out of the stock when free to drop.

To operate the head-block expeditiously I prefer to employ a lever D properly united therewith, as at $D^2$, and fulcrumed at $D^3$, a foot-lever $D^4$ engaging the foot of the lever D', so as to force the foot outward and thereby force inward the head-block. A spring $D^5$ automatically retracts the operating-lever and head-block.

H denotes a nail-bar, constructed with a series of orifices, as at $h$, to receive and guide the individual nails desired to be driven into the brush-head.

I denotes a reciprocatory driving-bar, provided with driving-fingers I'.

J is a guide-plate through which the fingers pass.

The nails to be driven into the head in this machine are cut from reels of wire. To this end K represents the reels and K' the wires led therefrom. Any desired straightening devices may be employed, as, for instance, a suitable arrangement of rolls $K^2$. The guide-plate J is perforated, as shown at $j$, for the passage of the wires which are led thereto.

L represents a horizontally-reciprocating cutter blade or knife, located just forward of the guide-plate J, as shown. This knife is provided with a series of cutter-blades or cutting-edges, as shown at $l$, constructed to shear off the wire to form the nails $l'$ as required. A series of partitions L' laterally divide the space between the nail-bar and the guide-plate, forming a series of pockets $l^2$, causing the individual nails to drop thereinto, and in which they are thus held and guided in position to be driven by the driving-fingers through the nail-bar and into the brush-block. $L^2$ is a lever-plate to close said pockets. $L^3$ is a base-plate at the base of said pockets.

Figure 11:
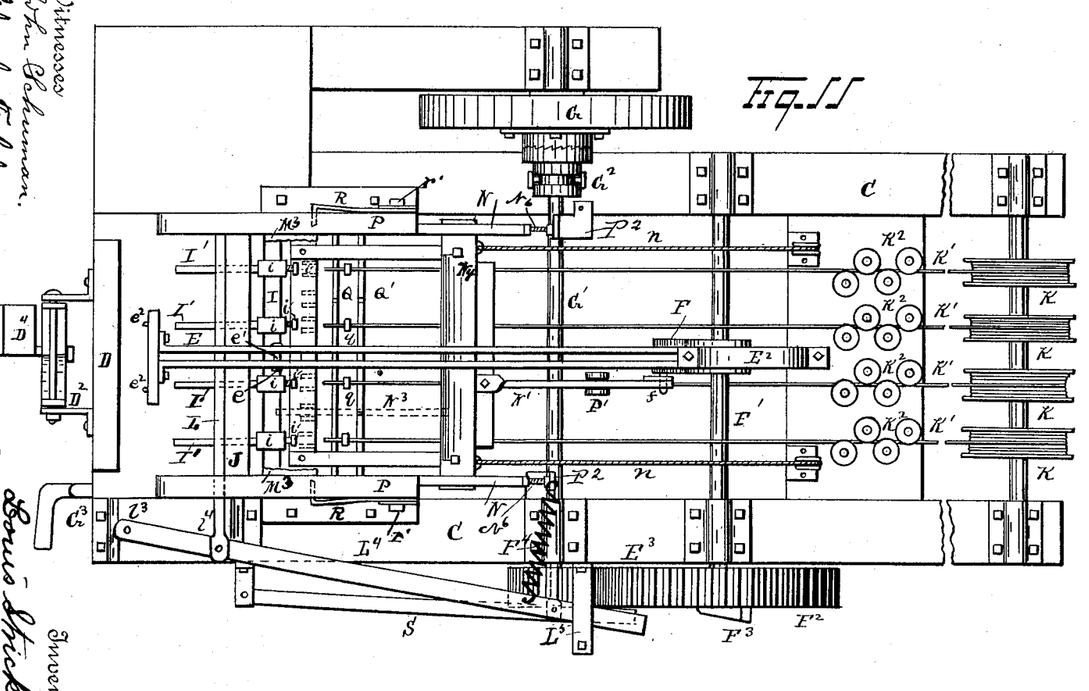
Fig. 11 is a plan view with certain parts broken away to more clearly illustrate the invention.
Figures 12, 13:
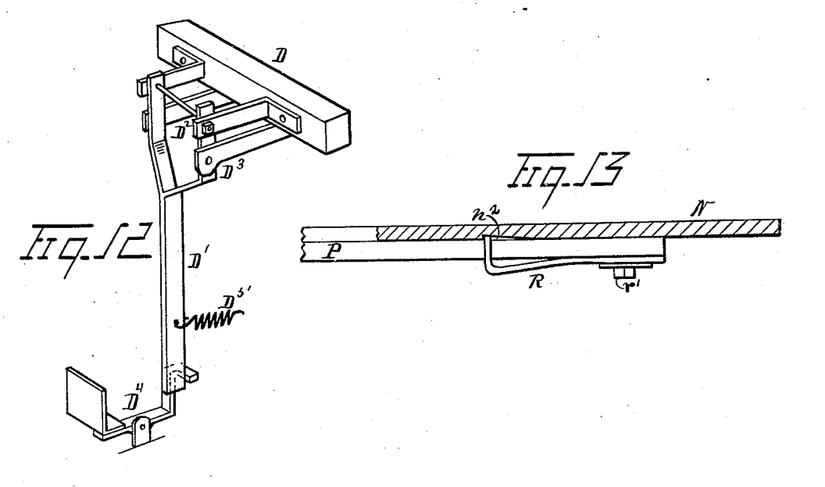
Fig. 12 is a detail view of the mechanism to operate the movable head-block.
Fig. 13 is a horizontal section on line $v\,v$, Fig. 9.
Figure 14:
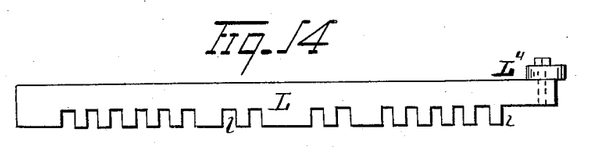
Fig. 14 is a rear elevation of the cutter-blade.
Figure 15:
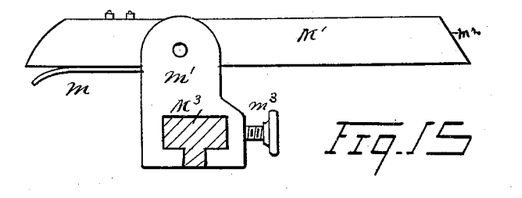
Fig. 15 is a detail view showing the lateral adjustability of the feeders.

To reciprocate the cutter-blade a lever $L^4$ is fulcrumed upon the frame at its forward end, as shown at $l^3$, and connected to said blade, as shown at $l^4$. The opposite end of said lever is carried back adjacent to the side of the gear $F^2$, which is provided with a cam $F^3$, the construction and arrangement being such that when the gear $F^2$ rotates and the cam strikes the lever the adjacent end will be forced outward, carrying with it the knife. A spring $F^4$ automatically retracts the lever and returns the knife to its normal position. $L^5$ is a guide-arm to hold the lever $L^4$ in proper position. To feed the wires properly to the knife, I provide the machine with side plates P on the two sides thereof, in which a carriage N has a reciprocatory movement in guideways $P^3$, Fig. 25. With this carriage N are rigidly engaged bed-plates $M^3$ $M^4$, moving forward and backward with said carriage. A series of wire-feeders M' are mounted upon the bed-plate $M^3$, said feeders consisting of a bar M' and spring-fingers $m$, arranged to press upon the wire and bind it firmly upon the underlying bed-plate $M^4$ when the bar M' is tilted, as shown in dotted lines, Fig. 20. Said bars M' are pivotally engaged toward their forward ends upon brackets $m'$, engaged upon the plate $M^3$, shown broken away in Fig. 11. The rear ends of said bars M' are beveled, as shown at $m^2$. This carriage is also employed to force forward the driving-bar. Accordingly the driving-bar I also has a reciprocatory movement in said guide-plates P in guideways $P^4$, Fig. 25. To reciprocate said driving-bar I, the carriage is provided with a cross-bar $N^2$, having a reciprocatory movement in the carriage. To this end the carriage is constructed with elongated slots $n'$, in which the cross-bar $N^2$ is engaged, which cross-bar $N^2$ is connected with the driving-bar I, as by connecting-bars $N^3$, one of which bars $N^3$ is shown in dotted lines in Fig. 11. The movement of the cross-bar $N^2$ in said slots may be regulated by means of set-screws $N^6$, as may be desired. With said cross-bar $N^2$ is engaged an arm N', extending rearwardly toward the cam F, said cam being provided with a shoulder or pin $f$, arranged to strike said arm as the cam rotates, thereby driving the said cross-bar N² forward.

P' is a guide-bracket for said arm.

Engaged upon the cross-bar N², or constituting an integral part thereof, is a cross-bar N⁴, which is constructed with a beveled front face corresponding to the rear end of the finger-bar M' located in advance thereof. As so constructed and arranged, it will be evident that as the compound cross-bar N² N⁴ is advanced it will first have a movement independent of the carriage, whereby the driving-bar I is first advanced, said bar sliding in the carriage before the carriage begins to move. It will be evident that the driving-bar must have a longer movement than the wire-feeders, because in their retraction the driving-fingers must move backward sufficient to clear out of the way of the falling nails cut off by the cutter-bar. The driving-bar therefore must be independently advanced to compensate for the increased retraction. When the cross bar N² has been advanced a proper distance in the slots n', the beveled face of the cross-bar N⁴ will strike the rear ends of the finger-bars M'. The adjacent faces being beveled as shown, it is evident that the finger-bar will be tilted and the spring-fingers m consequently forced into firm contact with the wire to bind it upon the bed-plate M⁴. The cross-bar N² will have an independent movement in said slots of the carriage until the limit of the slots is reached, when, it will be evident, the carriage is necessarily forced forward therewith. The wire, as above described, being held in firm contact upon the bed-plate M⁴, is advanced as the said bed-plate is advanced with the carriage to feed the wires to the cutter-blade. The driving of the nails and the feeding of the wires are thus accomplished, consequently, by the movements of the cross-bars N² N⁴ and of the carriage, as above set forth.

The carriage is made self-retracting in any suitable manner, as by a weight N⁵, connected by cables n to the cross-bar N². In retracting the carriage it is obvious that the cross-bar N² will be first retracted independently of the carriage until the rear extremities of the slots in the carriage are reached when the carriage will be retracted therewith.

To prevent the wires from pulling back in cutting the nails therefrom, I lead the wires across notched bars Q Q', the wires resting in the notches. Intermediate said bars I suspend a weight q to each wire to hold it firmly, the wires being preferably passed through the weight.

To regulate the cut of the nails longer or shorter, as may be desired, I provide the side plates P each with a spring R, engaging the carriage N, the carriage being provided with notches n² to receive the end of the spring. Thus when the spring is adjusted longitudinally forward and retained by means of the nut r', inserted through the elongated aperture r in said spring, it is evident that by the adjustment of said spring, the free end thereof engaging the notch, the movement of the carriage while retracting will be limited, thereby decreasing the distance of its advance movement, and consequently feeding less wire to the cutters. Should, however, this spring fail to work, I provide as a safeguard a stop P², which would in that event serve to stop the carriage.

To automatically stop the machine when the carriage has been driven forward to impel the nail drivers and feeders to their work, I provide an arm S, connected with the clutch-operating lever G³ by a rod G⁹. This arm S is located with its free end adjacent to the gear F², and is pivoted to a rod S', which is connected with the clutch, so that as the cam F³ comes in contact therewith the free end of the lever is forced outward, carrying said arm S' to throw the clutch G² out of gear.

Figures 18, 24, 25:
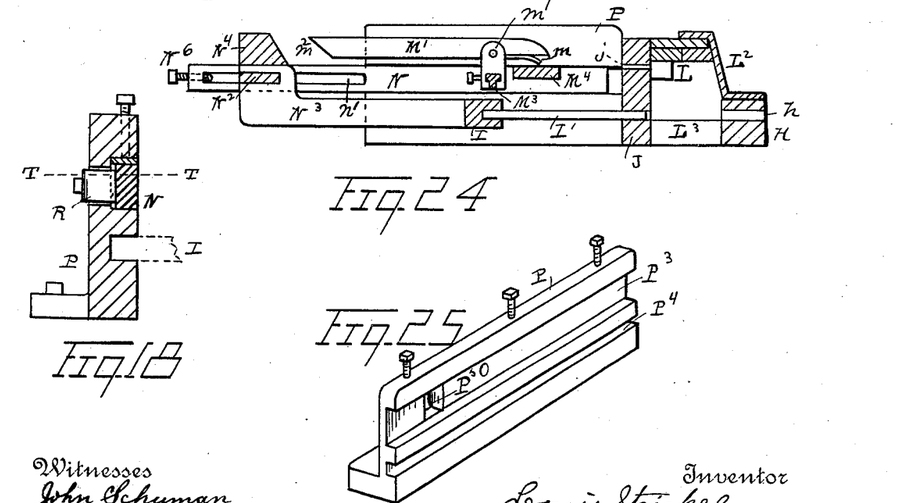
Fig. 18 is a vertical section on the line $u\,u$, Fig. 9.
Fig. 24 is a view of portions of the mechanism, looking toward the inner face of the side plate P, showing parts in section and parts in elevation.
Fig. 25 is a view in perspective of one of the side plates, looking at the interior face.
Figure 20:
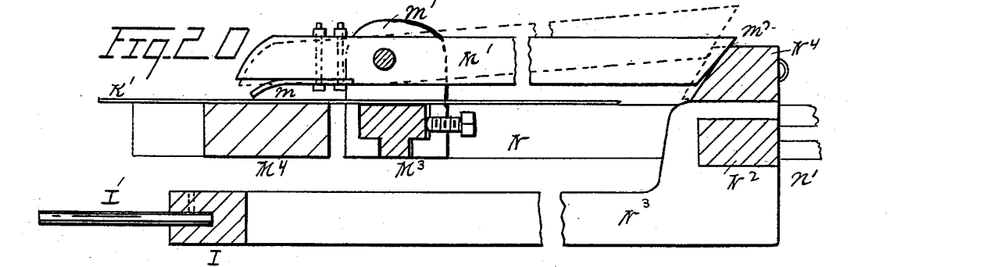
Fig. 20 is a detail view showing a wire-feeder, driving-bar, and finger with the cross-bar $N^2$ $N^4$ in engagement therewith.
Figure 21:
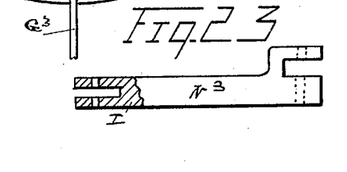
Figure 22:
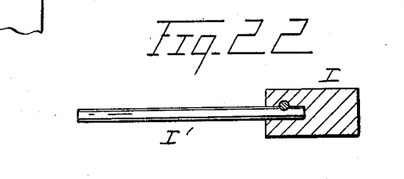
Fig. 22 is a detail view showing the driving-bar and a driving-finger secured thereto.

To render the driving-fingers adjustable laterally the same are engaged upon the driving-bar I by means of a collar i and set-screw i'. The feeders are also made laterally adjustable in any suitable manner, as by locating the brackets m' upon a cross-bar M³, a set-screw engaging the bracket thereupon, as shown in Figs. 20 and 24. The spring R is constructed with an elongated aperture r to allow the desired adjustability of the carriage be means of the set-screw r'.

While I have illustrated and described a rotatable cam for driving various parts of the machine, I would have it understood that I do not confine myself thereto, as the driving mechanism may be varied without departing from my invention.

Figure 19:
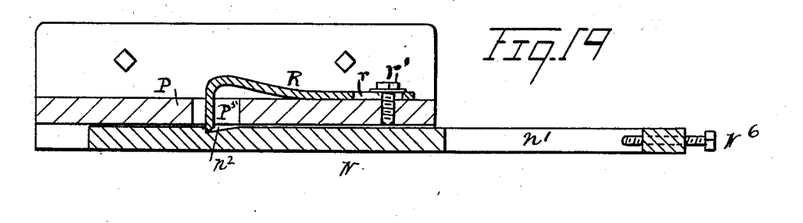
Fig. 19 is a horizontal section on the line T T, Figs. 9 and 18.

It will be seen by reference to Fig. 19 more particularly that as the carriage moves in the advance direction the spring R will ride out of the notch n². On the opposite movement of the carriage, however, the spring will drop into said notch when reached and hold the carriage from further movement in that direction. The end of said spring acts through an orifice P⁵ in the side plates.

Having thus described my invention, I claim as new—

1. In a brush-making machine, the combination of a main frame, a device for holding a brush-head thereon, a device for forcing the stock into the brush-head, wire-feeders, a cutter for severing the wire into nails, drivers for driving the nails so formed laterally through the brush-head to retain the stock therein, and driving mechanism for each of the movable parts.

2. The combination of a main frame, a carriage mounted to slide on said frame, wire-feeders and nail-drivers actuated by said carriage, a cutter, means for advancing said carriage, means for retracting it, and an adjustable device for limiting the retrograde movement of said carriage, whereby shorter or longer nail-lengths of wire may be furnished to the cutter, as desired.

3. In a brush-machine, the combination, with the sliding carriage, of wire-feeders carried by said carriage, each of which consists of a pivoted finger and a bed plate or bar between which and the finger the wire passes, means for tilting the finger to cause the same to pinch the wire, and means for advancing and retracting the carriage.

4. In a brush-machine, the combination, with the main frame, of a carriage mounted to slide thereon, means for actuating said carriage, wire-feeders and nail-drivers actuated by the carriage, and a cutter for severing the wire into nail-lengths.

5. In a brush-machine, the combination, with a supporting-frame, of a carriage mounted to slide thereon, means for actuating said carriage, a pivoted lever, a driving device carried by said lever to force the fiber in the head of the brush, wire-feeders and nail-drivers carried by said carriage, means for impelling said carriage, wire-feeders, and drivers, and a cutter to sever the fed wire into nail-lengths.

6. In a brush-nailing machine, the combination, with the nail-bar and the guide-plate J, spaced apart to form a chamber and partitions in said chamber, of wire-feeders for advancing the wire, a cutter for severing the wire into nail-lengths, which several parts fall into the compartments formed by said partitions, and nail-drivers working through said compartments to force the nails to the work.

7. In a brush-making machine, the combination, with a sliding carriage, of wire-feeders sliding therewith and having a sliding engagement relatively thereto independently of the sliding movement of the carriage.

8. In a brush-machine, the combination, with a sliding carriage, of wire-feeders sliding therewith and having a sliding engagement thereon, and means for limiting the movement of the feeders with respect to the carriage.

In testimony whereof I sign this specification in the presence of two witnesses.

LOUIS STRICKEL.

Witnesses:
N. S. WRIGHT,
JOHN SCHUMAN.